United States Patent [19]
Higgins

[11] Patent Number: 5,674,384
[45] Date of Patent: Oct. 7, 1997

[54] FILTER PRESS WITH WEIGHT-RESPONSIVE BUMPING OF FILTER PLATES

[75] Inventor: David Mark Higgins, Holland, Mich.

[73] Assignee: JWI, Inc., Holland, Mich.

[21] Appl. No.: 546,107

[22] Filed: Oct. 20, 1995

[51] Int. Cl.[6] .................................................. B01D 25/34
[52] U.S. Cl. ..................... 210/106; 210/143; 210/225; 210/230
[58] Field of Search .............................. 210/106, 143, 210/225, 230, 407; 100/198, 199

[56] References Cited

U.S. PATENT DOCUMENTS

| | | | |
|---|---|---|---|
| 4,209,404 | 6/1980 | Yoshida . | |
| 4,446,020 | 5/1984 | Kurita | 210/225 |
| 4,806,239 | 2/1989 | Davis | 210/225 |
| 4,963,255 | 10/1990 | DeHaan et al. . | |
| 5,133,884 | 7/1992 | Carlsson et al. | 210/791 |
| 5,167,801 | 12/1992 | Kawasaki . | |
| 5,328,617 | 7/1994 | De Haan | 210/225 |

FOREIGN PATENT DOCUMENTS

| | | |
|---|---|---|
| 0 512 391 A1 | 11/1992 | European Pat. Off. . |
| 2923967C2 | 12/1980 | Germany . |
| 3520571A1 | 12/1986 | Germany . |
| 3640171 | 5/1988 | Germany ............... 210/225 |
| 37 42 363 C1 | 11/1988 | Germany . |
| 4307601C1 | 5/1994 | Germany . |
| 209623 | 11/1984 | Japan .................... 210/230 |
| 1 653 808 A1 | 5/1991 | U.S.S.R. . |

*Primary Examiner*—Matthew O. Savage
*Attorney, Agent, or Firm*—Flynn, Thiel, Boutell & Tanis, P.C.

[57] ABSTRACT

A shifter mechanism for a filter press, which shifter mechanism incorporates a vibrating mechanism for effecting bumping of individual filter plates during the separation thereof from the closed stack to assist in dislodgement of filter cake from the individual filter plates. The vibrating device can selectively vibrate or bump the individual filter plates responsive to the weight of the filter plate being bumped, whereby the vibrating device will be activated only upon sensing a filter plate having a weight greater than a predetermined value so as to be indicative of an undesired quantity of filter cake being adhered thereto.

18 Claims, 7 Drawing Sheets

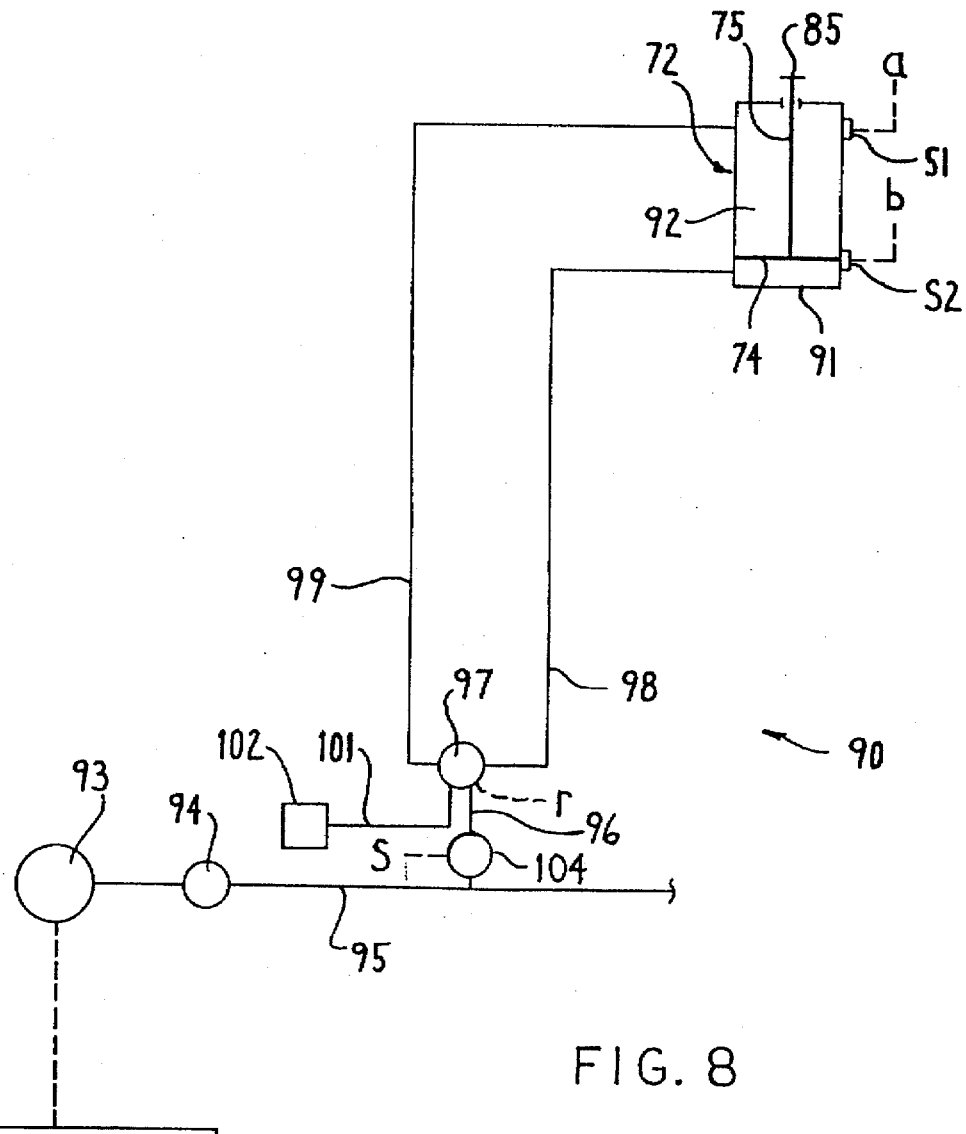
FIG. 8
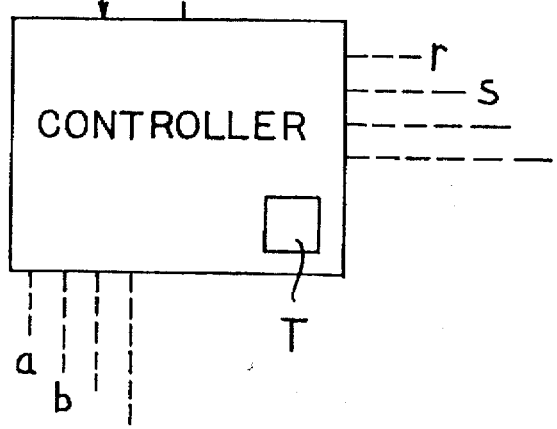

FILTER PRESS WITH WEIGHT-RESPONSIVE BUMPING OF FILTER PLATES

FIELD OF THE INVENTION

This invention relates to a filter press and, more specifically, to an improved plate shifter which employs a weight-responsive vibrating device for bumping the individual plates during opening movement thereof to assist in dislodgement of filter cake.

BACKGROUND OF THE INVENTION

Filter presses are well known and extensively utilized for separating solids from slurries. Such presses employ a plurality of filter plates which are held in contacting relationship between fixed and movable head members while the slurry is pumped into and through the press for collecting the solid in the form of filtrate or cake between adjacent filter plates. When the press is full, then the movable head is backed away from the plates into an open position and, in one conventional type of press, the plates are then individually and sequentially moved into an open position adjacent the movable head to permit discharge of the cake which has collected between adjacent pairs of plates. To permit movement of the plates into an open position, plate shifting mechanisms are typically provided adjacent opposite sides of the press for permitting automatic or manual control over the plate movement and cake discharge.

In a conventional press, a pair of substantially identical plate shifter mechanisms are typically provided adjacent opposite sides of the press for synchronous cooperation with handles of the individual plates, whereby the shifter mechanisms reciprocate back and forth along the press side rails so as to individually but sequentially move each plate toward the opened head for permitting cake discharge. These mechanisms typically each employ a pair of movable stops or pawls, one for abutting the leading plate in the stack to prevent advancing movement of the shifter mechanism, the other for engaging the opposite side of the leading plate to move it toward the movable head when the shifter mechanism is moved in the opposite direction. One example of such mechanism is disclosed in Assignee's U.S. Pat. No. 4,963,255.

Conventional filter presses have often operated in a less than satisfactory manner, particularly when utilized with materials which result in filtrate or cake having "sticky" properties. That is, relying solely on gravity to cause discharge of "sticky" cake from between the opened filter plates is often insufficient to effect proper discharge since the cake tends to stick to the filter cloths or membranes of the plates. It is often conventional practice to manually assist the discharge by having an operator scrape the sticky cake from the filter plates by use of a paddle or the like.

In an attempt to effect automatic discharge of sticky cake, and avoid the requirement of manual assistance, air nozzles have been used for blasting air against the plate to assist in loosening of the cake. Such arrangement is disclosed in Assignee's U.S. Pat. No. 5,328,617. The Assignee has also attempted to assist discharge by utilizing a vibrating or bumping device, but such device, as also disclosed in aforementioned U.S. Pat. No. 5,328,617, is a wholly independent mechanism provided on the arch of an arch-type shifting mechanism, and the bumping mechanism of this '617 patent engages the lead plate in the stack and effects bumping thereof only when the plate is still engaged with the stack, following which the plate is then moved into the open position. While this bumping is believed effective in assisting dislodgement of cake, nevertheless the position of the bumping and the mounting of the mechanism as disclosed in the '617 patent does not provide for optimum utilization of this bumping characteristic.

In another known press, specifically a press manufactured and sold by Perrin of Canada, the filter plates are joined together through a control device such as a cable or linkage so that, during opening of the press, all of the plates are substantially simultaneously moved into an open separated condition with the spacing or separation between each adjacent pair of plates being controlled by the connecting linkage. All of the plates, adjacent one side thereof, are supported on an elongate tube which extends longitudinally along the press and is of square or rectangular profile. This tube is then rotated to impose a vibration or bouncing movement on the handles provided adjacent one side of the filter plates, whereby all of the plates are simultaneously vibrated on one side thereof to assist in discharge of the sticky cake. While this arrangement is at least partially effective for permitting discharge of sticky cake, nevertheless such arrangement is undesirable from a structure standpoint since it requires an additional vibrating drive shaft extending longitudinally throughout substantially the length of the press, and in addition requires a long support frame or support rail arrangement since all of the filter plates are moved into an opened and spaced relationship at the same time.

In a still further attempt to assist discharge by utilizing a vibrating or bumping device, the arrangement disclosed in Assignee's prior copending U.S. patent application Ser. No. 08/377,537 was also developed. In the arrangement of this '537 application, a vibrating device for the individual filter plates is incorporated directly on the plate shifters which are supported on and moved longitudinally along the side rails of the filter press, with the vibrating device employing a vertically swingable bumping lever which in turn is cyclically activated by a rotating cam which is in turn rotated in response to the return movement of the plate shifter along the press side rail. While the vibrating device of this '537 application has proven effective in vibrating the individual filter plates during opening movement thereof so as to assist in dislodgement of filter cake, nevertheless the vibrating or bumping of the individual plate occurs in a cyclic or repetitive manner throughout the entire return or opening movement of the plate, with each plate being treated or vibrated the same during the opening movement thereof. This thus tends to lead to an excessive number of bumping cycles in many instances since the bumping rate cannot be readily varied as the plate is moved in the opening direction. Further the overall vibrating device is almost entirely mechanical in nature, and thus the device possesses a great number of parts and assembly steps, thereby providing a greater degree of overall structural and operational complexity than desired.

Accordingly, it is an object of this invention to provide an improved shifter mechanism for a filter press, which shifter mechanism incorporates a vibrating mechanism for effecting bumping of individual filter plates during the separation thereof from the closed stack to assist in dislodgement of filter cake from the individual filter plates. The improved vibrating mechanism of this invention, as incorporated on the plate shifter mechanism, provides for increased flexibility and efficiency of operation with respect to the ability to selectively bump the individual plates, including the ability to more selectively control the number of bumping cycles for each individual plate.

More specifically, it is an object of the invention to provide an improved shifter mechanism for a filter press having a vibrating device provided thereon, as aforesaid, which vibrating device will selectively vibrate or bump the individual filter plates during opening of the press as a function of the overall weight of the plate, whereby selection of the individual plates to be bumped, and the number of bumping cycles, is related to the amount of cake which is adhered to the filter plate. With this improved vibrating device, activation thereof is responsive to the weight of the filter plate being bumped, whereby the vibrating device will be activated only upon sensing a filter plate having a weight greater than a predetermined value so as to be indicative of an undesired quantity of filter cake being adhered thereto, with subsequent bumping cycles in turn being activated in response to weight sensing so that the number of bump cycles, up to at least a predetermined maximum, will in turn be controlled by the weight of the filter plate so as to provide desired control over the bumping of each plate including the number of bumping cycles.

It is a further objection of the invention to provide an improved shifter mechanism, as aforesaid, which is of simple structure and operation, is inexpensive to construct, is reliable in operation, and provides a vibrating function for the individual filter plates as they are being moved in an opening direction without requiring extraneous complex structures, controls or functions.

In the improved shifter mechanism of the present invention, as aforesaid, the mechanism includes a reciprocal housing which is supported for movement along the side rail of the press and, in addition to the usual pawls for stopping shifting movement in one direction and effecting opening driving of the frontmost filter plate in the opposite direction, also includes a vibrator which is mounted on the shifter housing and cooperates with the frontmost filter plate to effect raising of at least one side of the filter plate being shifted, followed by dropping thereof onto the side rail so as to impose an impact or bump thereon to assist in loosening of the filter cake adhered thereto. The vibrating device includes a fluid pressure controlled actuator which engages a horizontal projection on the frontmost filter plate, such as the side handle of the filter plate, to effect vertical lifting of the filter plate, with the sudden deactivation of the actuator permitting a generally gravity-induced free fall of the filter plate back onto the press side rails. The pressure of the fluid which is supplied to and controls the actuator during a weight-sensing step responds to the weight of the filter plate, and effects lifting and subsequent bumping or dropping of the plate only when the plate exceeds a predetermined weight so as to indicate the presence of excessive filter cake adhered thereto.

Other objects and purposes of the invention will be apparent to persons familiar with structures of this general type upon reading the following specification and inspecting the accompanying drawings.

BRIEF DESCRIPTION OF THE DRAWINGS

FIG. 8 is a diagrammatic view of the electronic and fluid control arrangement for the weight-sensing and vibrating system.

Figure 1:
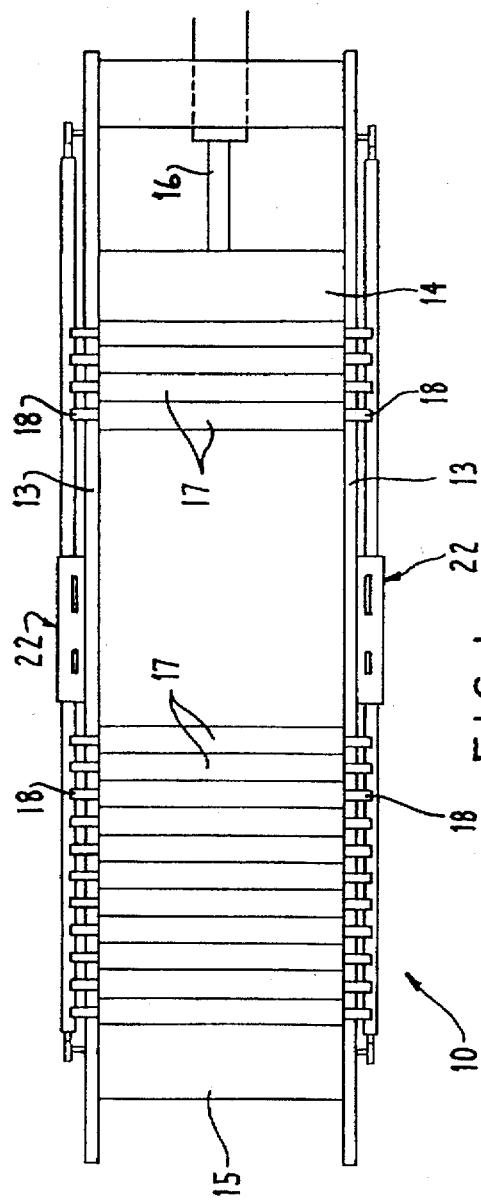
FIGS. 1 and 2 are diagrammatic top and side views, respectively, of a conventional filter press.

Certain terminology will be used in the following description for convenience in reference only, and will not be limiting. For example, the words "upwardly", "downwardly", "rightwardly" and "leftwardly" will refer to directions in the drawings to which reference is made. The word "forwardly" will be used in relationship to leftward shifting of the filter plates in FIGS. 1, 2, 4 and 6, and the word "rearwardly" will refer to rightward shifting of the filter plates in the same figures. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Figure 2:
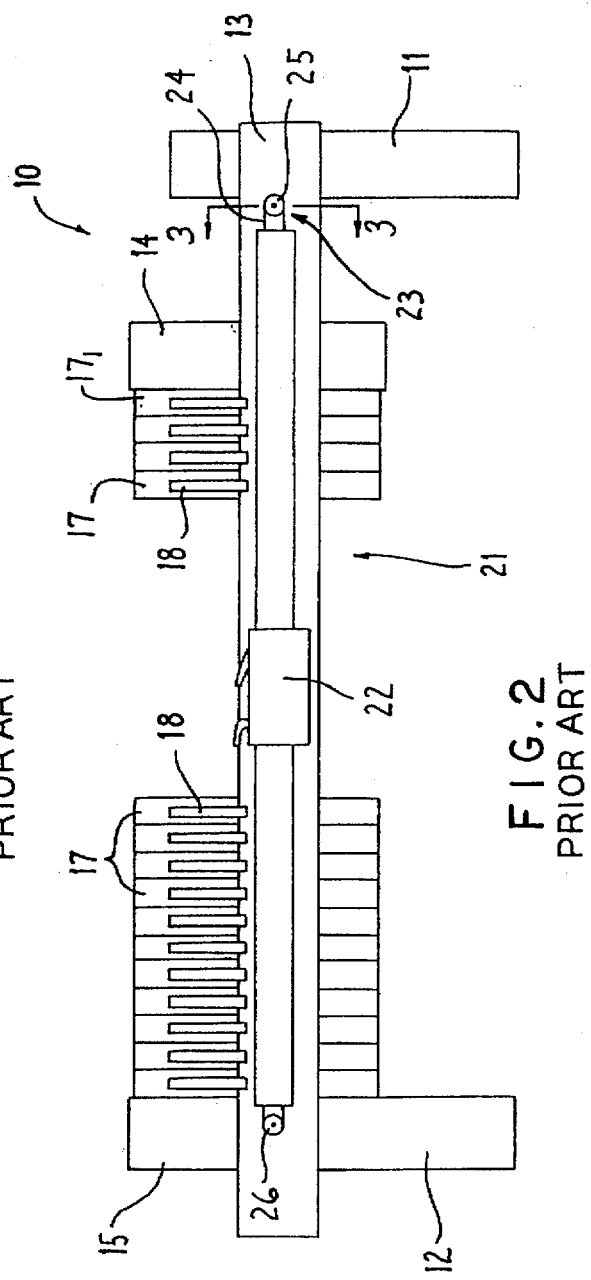

As shown in FIGS. 1 and 2, there is illustrated a generally conventional filter press 10 having a pair of end supports 11 and 12 rigidly joined together by a pair of generally parallel and horizontally elongate side rails 13, which side rails are sidewardly spaced apart and cooperate with the end supports to define a generally rigid frame.

The filter press has a movable follower or head arrangement 14 disposed adjacent one end of the press frame and slidably supported for movement along the side rails 13. This movable head 14 is slidably displaceable horizontally along the side rails toward or away from a further head 15 which is fixed to the frame adjacent the other end of the side rails. A drive device 16, such as a conventional double-acting pressure cylinder, is mounted on the frame and cooperates with the movable head 14 for controlling movement thereof either toward or away from the fixed head 15.

A plurality of conventional filter plates 17 are suspendingly supported on and between the side rails 13. The filter plates extend generally transversely between the side rails so that the plates are disposed in adjacent relationship to form a generally horizontally extending stack of plates in the longitudinal direction of the press. Each filter plate 17 has support arms or handles 18 which project outwardly from opposite sides of the respective filter plate in overlapping and slidable supportive engagement with the upper edges of the side rails 13, thereby enabling the filter plates to be slidably displaced along the side rails in the longitudinal direction of the filter press. The support arms or handles 18 have a width in the lengthwise direction of the press which is significantly less than the width of the respective filter plates 17, whereby adjacent handles 18 define clearance spaces of predetermined width therebetween when adjacent filter plates are in abutting engagement, substantially as illustrated by FIG. 2.

As is conventional, the driving device 16 is activated to move the head 14 forwardly (leftwardly in FIGS. 1 and 2) so that the stack of filter plates 17 are snugly and tightly held between the opposed heads 14 and 15. One or both of these heads have suitable conduits (not shown) connected therethrough for communication with the interior of the stack of filter plates. A slurry is supplied through one of the heads into the stack of filter plates, and the cleaned liquid flows outwardly through the plates and out through a conduit, whereupon the solids collect on the filters or membranes which extend across the ringlike frames of the filter plates.

To permit removal or dumping of the solids (i.e., filtrate or cake) which collect on the filter plates, the head 14 is moved rearwardly (rightwardly in FIGS. 1 and 2) into an open position substantially as illustrated by solid lines in FIG. 2, and then the filter plates 17 are individually and sequentially moved rearwardly (leftwardly in FIG. 2) away from the stack toward the movable head 14 to permit the solids which collect between plates to drop downwardly for deposit into a suitable collecting bin. To effect sequential and individual movement of the filter plates 17 away from the stack toward the open head 14, the filter press 10 has a plate shifting arrangement 21 which includes a pair of plate shifter mechanism 22, one such mechanism 22 being disposed exteriorly adjacent each of the side rails 13, and a drive device 23 which connects to the pair of shifter mechanisms 22 for effecting synchronous linear back-and-forth movement of these mechanisms 22 along the side rails 13.

Figure 3:
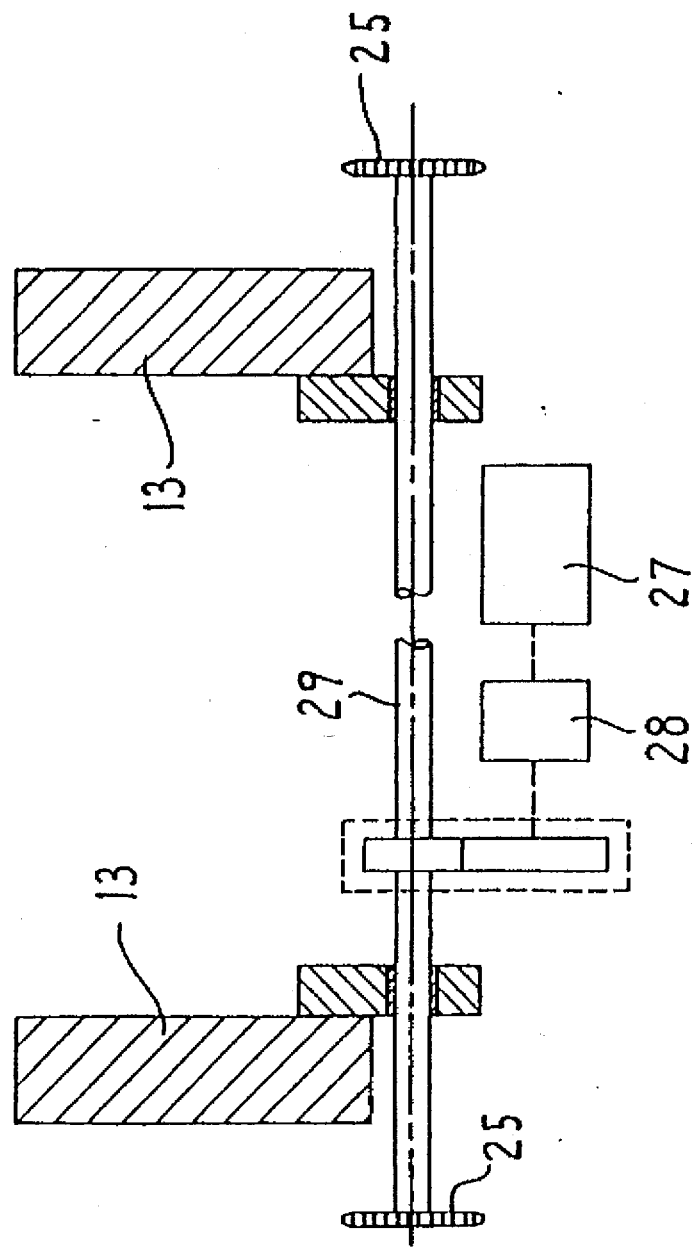
FIG. 3 is an enlarged, fragmentary view along line 3—3 in FIG. 2.

The driving device 23, as shown in FIG. 2, includes an elongate flexible drive member 24, specifically a chain, which extends generally longitudinally parallel with the adjacent side rail 13 and is supportingly engaged and driven by a drive sprocket 25 which is rotatably supported adjacent one end of the press, and is engaged on a rotatable idler sprocket 26 rotatably supported adjacent the other end of the press. The drive sprocket 25 is nonrotatably coupled to a drive shaft 29 (FIG. 3) which extends generally horizontally transversely of the press and is driven by a reversible drive motor 27 through a conventional torque-sensing reversing mechanism 28. The drive shaft 29 extends transversely across the press frame and is provided with identical drive sprockets 25 on opposite ends thereof which engage drive chains 24 provided adjacent the opposite side rails 13 so as to permit synchronous driving of the two shifter mechanisms 22 which are disposed adjacent the opposite side rails 13.

The overall structure and function of the filter press 10 as described above, including the driving device 23, is conventional and well known.

Considering now the shifter mechanisms 22, the two mechanisms 22 as positioned adjacent opposite sides of the press are identical except for being mirror images of one another, and hence only one such mechanism will be described below.

Figure 4:
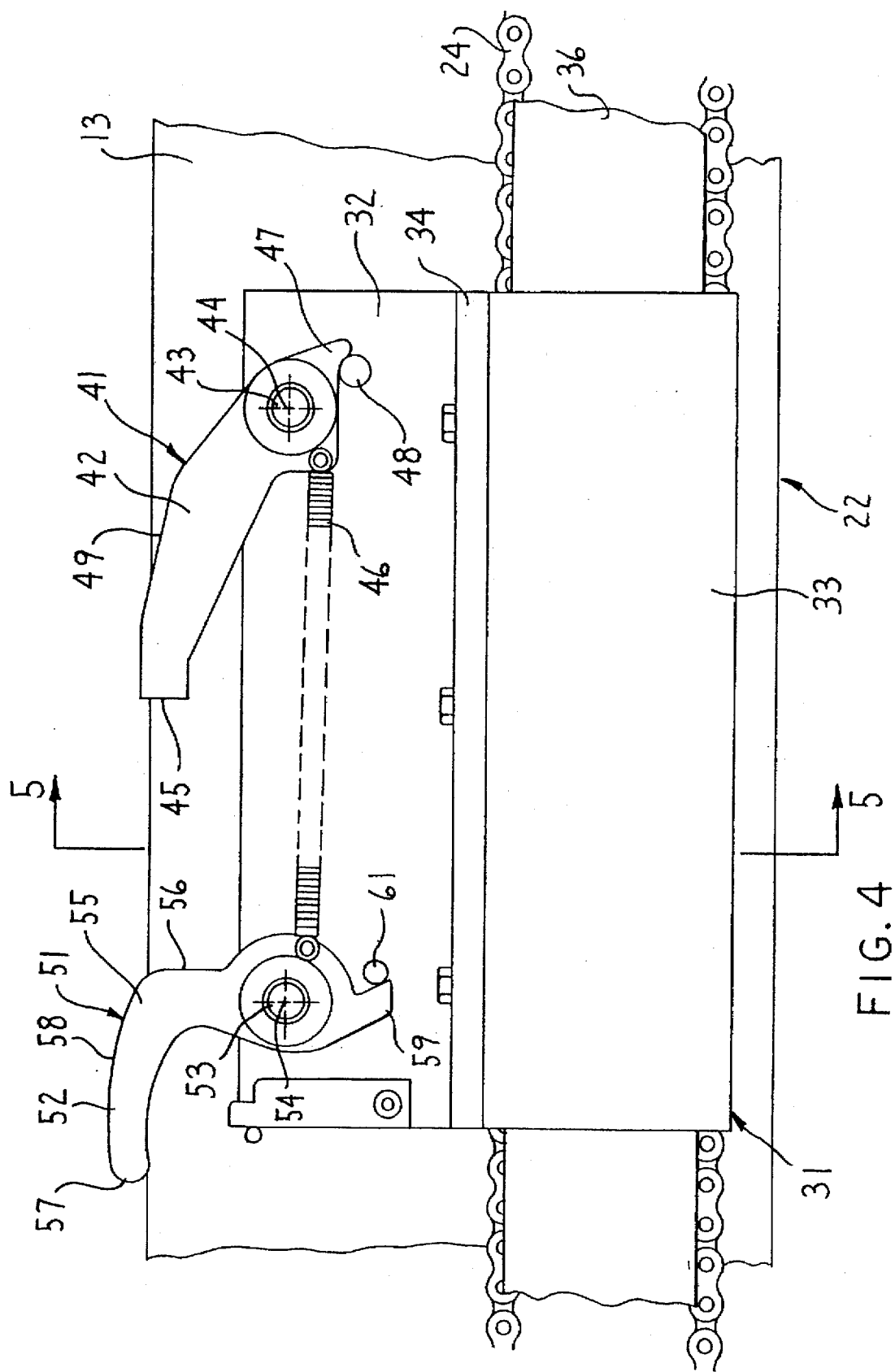
FIG. 4 is an enlarged, fragmentary side elevational view showing the shifter mechanism associated with one side of a filter press according to the present invention, the vibrating device being removed for clarity of illustration.
Figure 5:
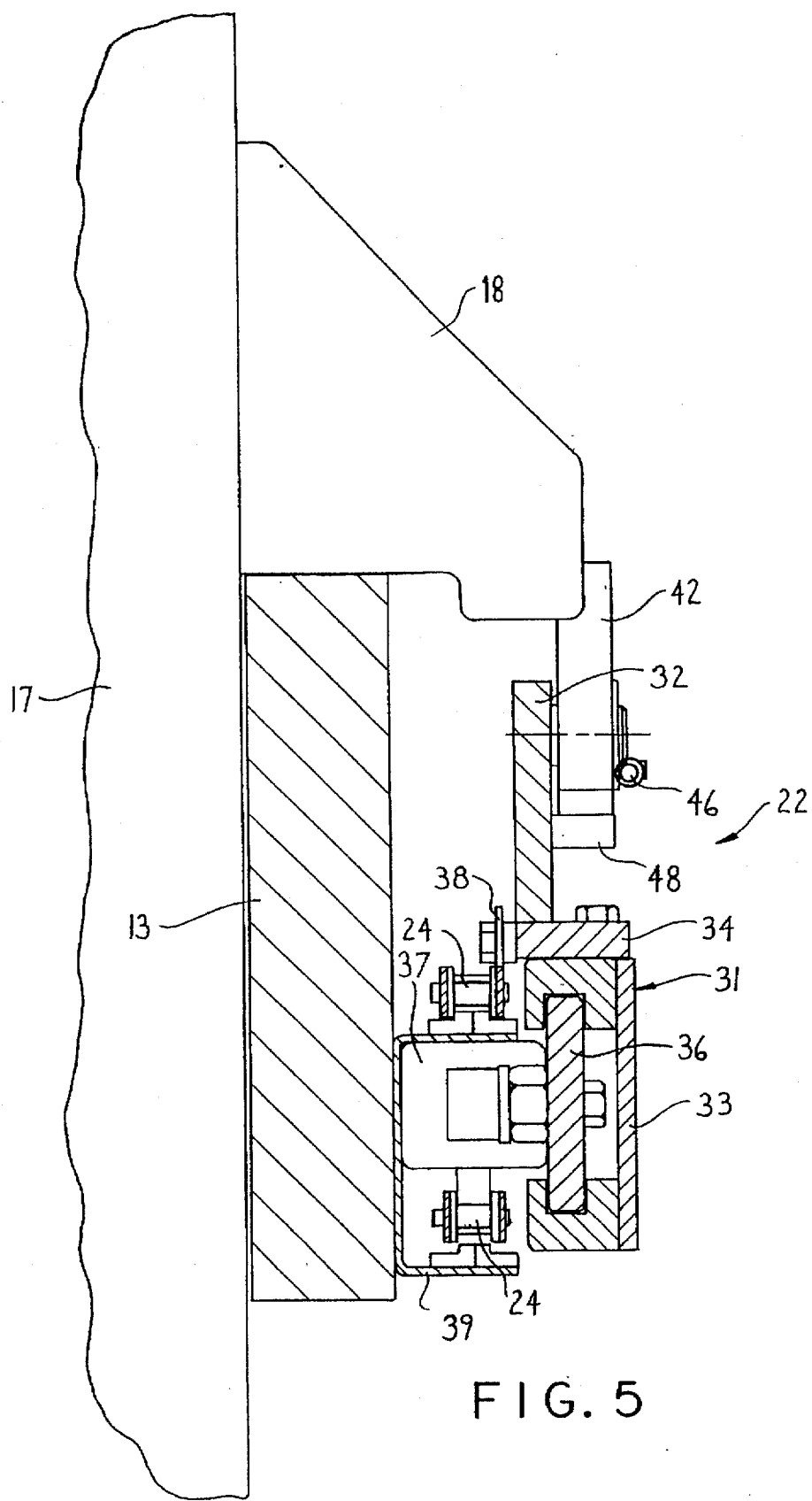
FIG. 5 is a sectional view taken generally along line 5—5 in FIG. 4.

Referring to FIGS. 4 and 5, the shifter mechanism 22 includes a carrier or housing 31 which is generally Z-shaped in cross section and includes generally vertically and horizontally extending top and bottom support plates 32 and 33 which are vertically and sidewardly spaced apart and are rigidly joined by a generally horizontally extending intermediate plate 34. A plurality of support rollers (not shown) are cantilevered inwardly from the bottom plate 33 and are disposed for straddling and rolling engagement with upper and lower edges of a horizontally elongate support track 36. This support track 36 is secured to a plurality of intermediate spacers 37 which are fixed to and project outwardly from the adjacent side rail 13 in longitudinally spaced relation therealong. These spacers 37 thus fixedly support the support track 36 in outwardly spaced relation from the adjacent side rail 13, with the track 36 being horizontally elongated longitudinally of the press so as to extend along a majority of the side rail to enable movement of the shifter mechanism 22 therealong.

The movement of the shifter mechanism is controlled by the drive chain 24, the elongate upper reach of which is joined to the shifter housing 31 by an intermediate connecting plate or link 38.

A horizontally elongated channel-shaped guide rail 39 is also fixed to and extends longitudinally along the outer side of each side rail 13. This guide rail 39 is provided for guiding the upper and lower reaches of the drive chain 24, with the upper and lower horizontally-projecting legs of this guide rail 39 respectively slidably supporting the upper and lower reaches of the drive chain as these reaches extend between the sprockets 25 and 26.

The shifter mechanism 22 mounts thereon a stop device 41 which coacts with the filter plates 17 to limit forward (leftward in FIGS. 1 and 2) movement of the shifter mechanism. This stop device 41 comprises a stop member 42 which is preferably formed as an elongate pawl or lever, and is supported at one end thereof by a pivot 43 which defines a generally horizontal axis 44 which extends generally perpendicular relative to the longitudinal direction of the press. This stop lever 42 has its pivot 43 supported on the top plate 32 of the shifter housing 31. The stop lever or pawl 42 defines an abutment surface 45 at the free end thereof which is adapted to abuttingly contact a front side or surface of the filter plate handle 18.

The stop pawl 42 is normally urged into an upper position, substantially as illustrated by FIG. 4, by a biasing spring 46. The stop pawl 42 also has a radially projecting tab or stop 47 thereon which is positioned for abutting engagement with a stop pin 48 fixed to the housing plate 32, which stop pin and its engagement with the tab 47 function to define the upper (i.e. stopping) position of the stop pawl 42 due to the urging of the spring 46. The stop pawl 42 also has the upper surface 49 thereof formed with a gradual convex curvature so as to function as a cam surface for slidable cooperation with the handles of the filter plates to permit passage of the stop pawl 42 beneath the handles 18 during the return (i.e. rightward) movement of the shifter housing.

The shifter mechanisms 22 also mounts thereon a plate driving device 51 which is defined primarily by a driving member 52 which is also formed as a pawl or lever, the latter being supported on the top housing plate 32 by a pivot 53, the axis 54 of which extends parallel with the axis 44 of the stop pawl 42. The pivot 53, however, is spaced longitudinally forwardly a substantial distance from the pivot 43, whereby the stop pawl 42 and drive pawl 52 are spaced from one another in the longitudinal direction of the press, with the drive pawl 52 being position more closely adjacent the forward end of the shifter housing 31.

The drive pawl 52 includes a generally L-shaped arm 55 which projects upwardly from the pivot 53, and the radially outwardly projecting inner portion of this arm defines on the front face thereof an abutment surface 56 which is adapted to abuttingly contact a rear surface of the filter plate handle 18. This radially outwardly projecting inner arm portion is in turn integrally joined to a circumferentially extending outer arm portion which projects in the forward direction of the press when the drive pawl 52 is in the normal raised position illustrated in FIG. 4. The drive pawl 52 terminates in a rounded free end 57 which in turn merges smoothly with a generally smooth and convex curved upper surface 58 of the pawl.

Drive pawl 52 also has a radial tab or stop 59 which is fixed thereto and projects outwardly for engagement with a cooperating stop 61 which is fixed to the housing plate 32. The engagement of tab 59 against stop 61 functions to define the normal raised position of the drive pawl 52 as shown in FIG. 4, and the drive pawl 52 is normally maintained in this raised position due to the biasing of a suitable spring, this being one end of the spring 46 in the illustrated embodiment, although a separate spring can be provided if desired.

The stop pawl 42 and drive pawl 52, when maintained in the raised positions shown in FIG. 4, are disposed so that the upper extremities thereof are at an elevation above the lowermost extremity of the handles 18 associated with the filter plates 17, and the upper extremities are positioned for engaging cooperation with the handles as the shifter mechanism 22 is moved relative to the filter plates 17.

More specifically, after the press has been filled with solids, the pump supplying the slurry into the press is shut down, the head 14 is returned to its open position, and the shifting mechanism 22 are then activated so as to individually and sequentially return the filter plates 17 from the closed position (i.e., the stack of plates positioned adjacent the head 15) into an open position adjacent the opened head 14. As the shifter mechanism 22 is moved toward the stack of filter plates, and when the shifter mechanism reaches the frontmost plate of the stack the rounded free end of drive pawl 52 contacts the front face of the handle 18, causing the drive pawl to pivotally swing downwardly (clockwise) into a lowered or retracted position, thereby enabling the drive pawl to pass under the handle 18. The shifter mechanism continues its rightward movement, and the drive pawl 52 after passing the handle of the front plate is then spring-urged upwardly so that the free end of the pawl 52 is urged into the space or gap defined by the handles of the adjacent plates. At about this same time the abutment end or nose of the stop pawl 42 contacts the front face of the handle of the endmost filter plate, thereby stopping further forward (i.e., leftward) movement of the shifter mechanisms.

The torque-reversing drive then causes the shifter mechanisms to begin their return movement (rightward) toward the opened head 14. During the initial return movement of the shifter assembly, the nose end of driving pawl 52 reacts against the handle of the adjacent plate due to the upward spring-urged swinging of the driving pawl, and this coupled with the movement of the shifter assembly causes the cam surface 58 of the drive pawl to react against the rear side of the handle on the lead or endmost filter plate, causing the endmost filter plate to be pried apart from and shifted rearwardly a small distance away from the next adjacent filter plate. In this latter position, the drive pawl 52 is prevented from further counterclockwise rotation since it is now engaged with the stop 61, and the abutment surface 56 thereon engages the rear of the handle on the endmost filter plate to effect rearward driving of this filter plate toward the opened head 14 in response to rearward or return movement of the shifter mechanisms longitudinally along the side rails 13.

The structure and function of the shifter mechanisms 22 and specifically the cooperation of the pawls 42 and 52 with the filter plates is conventional. Further, the structure and operation of the shifter mechanisms and of the pawls thereon, as briefly described above, is described and illustrated in detail in Assignee's copending U.S. application Ser. No. 08/377,537, the entire disclosure of which is incorporated herein by reference. Further detailed description of the structure and operation of the shifter assembly and specifically the driving and stopping pawls, and the overall cooperation with the filter plates to effect sequential shifting thereof into the opened position, is thus believed unnecessary.

In the present invention, the plate shifting arrangement 21 also incorporates a system or means for sensing the weight and for bumping the endmost plate of the stack after it has been initially separated from the stack by the driving pawls 52, with the weight sensing and bumping of the endmost plate preferably occurring during the return movement of the shifter mechanisms 22 as the endmost plate 17 is being driven thereby.

More specifically, one or both of the shifter mechanisms 22 mounts thereon a device 71 for weight sensing and bumping of the endmost filer plate during the return movement thereof. This device 71 includes a pressure fluid actuator 72 which, in the illustrated embodiment, comprises a generally conventional double-acting pneumatic cylinder having a housing 73 provided with a piston 74 (FIG. 8) slidably disposed therein, the latter having a piston rod 75 fixed thereto and slidably projecting outwardly through the upper end of the housing 73. The housing 73 is provided with trunnions 76 adjacent the lower end thereof, which trunnions define a substantially horizontally extending pivot axis 77 which extends in generally parallel relation with the longitudinal direction of the press. These trunnions 76 are rotatably supported on a pair of generally parallel and vertically projecting side frame plates 78 which are fixed to the lower plate 33 of the shifter housing 31.

The side frame plates 78 have generally parallel upper portions 79 which project upwardly and are spaced apart in the longitudinal direction of the press, with these upper portions 79 having identical and longitudinally-aligned elongate cam slots 81 formed therein. Each cam slot 81 includes an elongate upper slot portion 82 which projects upwardly in generally vertical relation, and the lower end of this upper slot portion 82 merges with and constitutes a continuous extension of the upper end of a lower slot portion 83. This lower slot portion 83 angles outwardly (i.e., sidewardly away from the press side rail 13) and downwardly relative to the upper slot portion 82.

The upper or free end of the piston rod 75 has a lifting or engaging member 85 fixed thereto, which member has a platelike configuration and projects transversely relative to the piston rod so that a flat upper surface 86 of the lifting member 85 extends generally in perpendicular relationship to the longitudinal axis 87 of the pressure cylinder. This lifting member 85, in the illustrated embodiment projects sidewardly from the piston rod in a direction toward the adjacent side of the press. The lifting member 85 has cam rollers or followers 88 mounted on opposite sides thereof, which cam rollers are movingly engaged within the cam slots 81 defined on the side frame plates 78.

Figure 6:
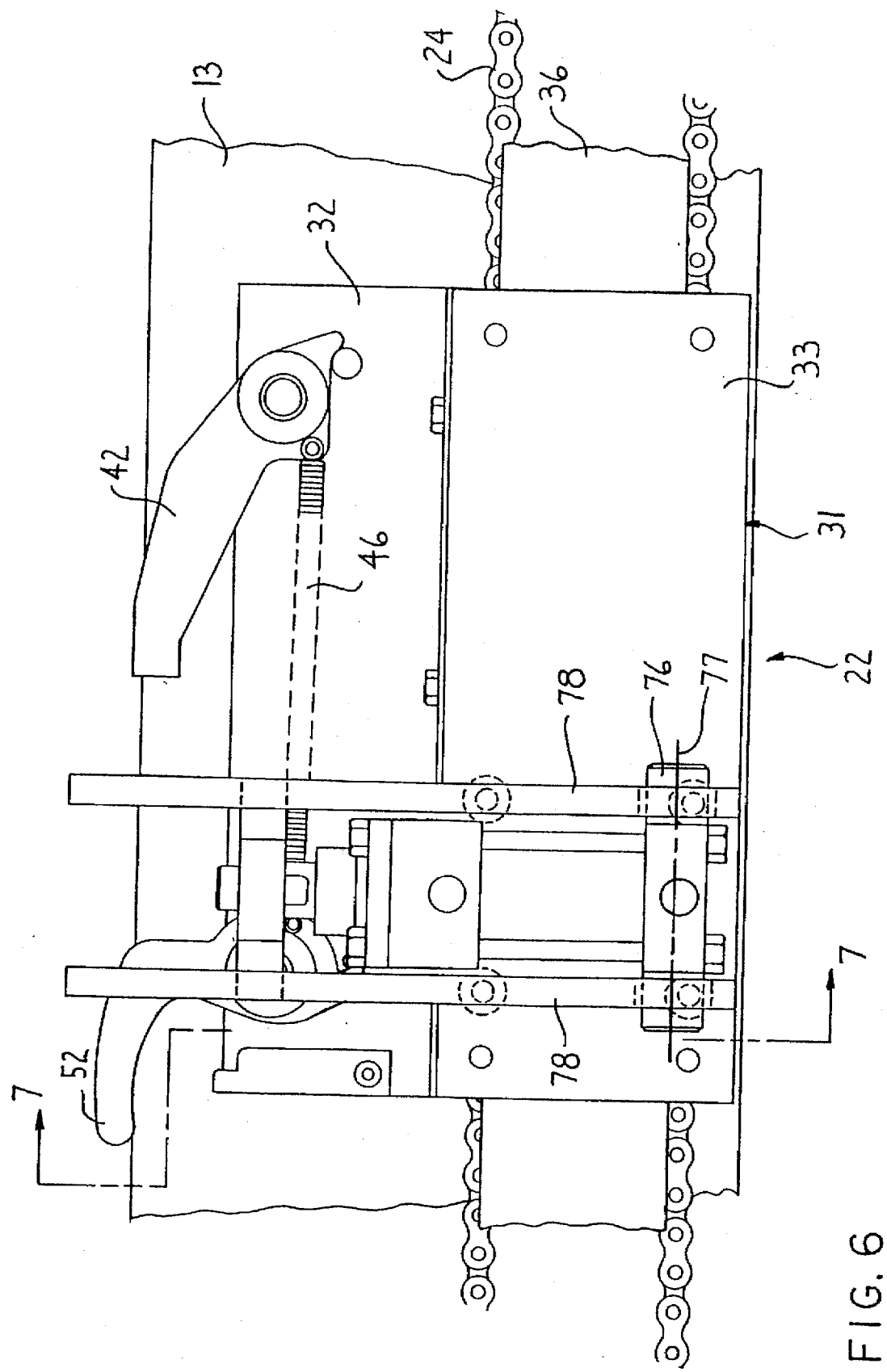
FIG. 6 is a fragmentary side elevational view which shows the shifter mechanism with the vibrating device mounted thereon.
Figure 7:
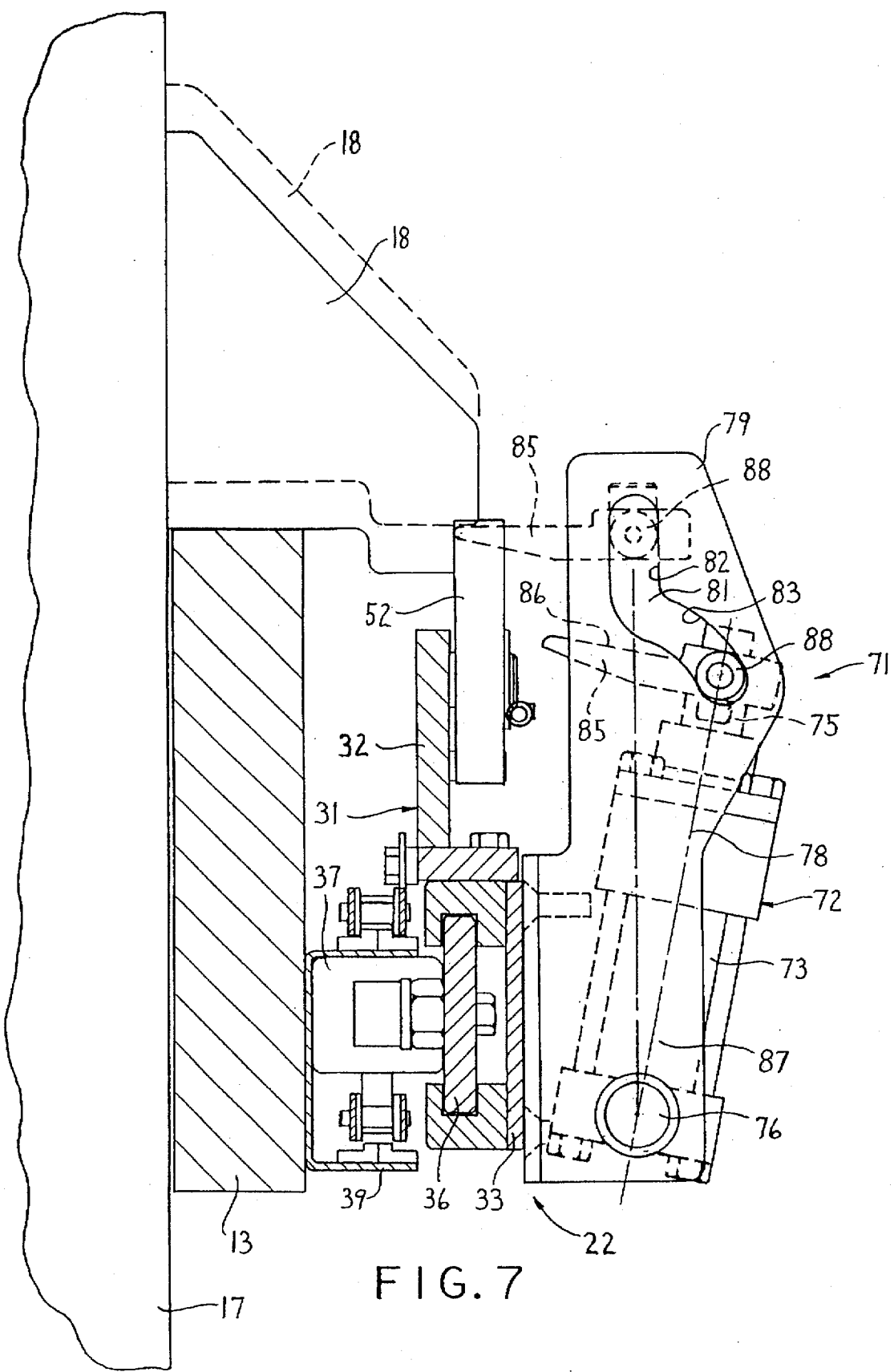
FIG. 7 is a sectional view taken generally along line 7—7 in FIG. 6.

In operation, the bumping device 71 is normally maintained in the lowered or retracted position as illustrated by solid lines in FIGS. 6 and 7, in which position the lifting blade 85 is positioned downwardly and angled outwardly away from the handles 18 of the filter plates. In this position, the lifting blade 85 is also disposed outwardly away from and hence does not interfere with the pivoting movement of the driving lever 52. When the bumping device 71 is activated, however, the driving lever 52 is in its raised position disposed in abutting engagement with a rear side of the handle 18, and thus as the piston rod 75 is raised upwardly, the cam followers 88 move along the lower curved cam slot 83 causing the lifting blade 85 to be initially swung inwardly for deposition directly under the lower surface of the handle 18 of the filter plate being shifted, following which the cam followers 88 then move upwardly along the upper straight cam slots 82 whereby the lifting blade 85 moves upwardly into the position indicated by dotted lines in FIG. 7, thereby causing that side of the filter plate to be raised upwardly a predetermined distance above the upper edge of the side rails 13. Thereafter the pressure cylinder 72 associated with the vibrating device 71 is reversely energized causing sudden downwardly contraction of the piston rod and sudden downwardly movement of the lifting blade 85, whereupon the raised side of the filter plate then effectively free falls downwardly so as to impact or bump against the side rail 13 to assist in dislodgement of filter cake adhered thereto.

The weight-sensing and bumping system of the present invention, in addition to the vibrating device 71 described above, also includes an electronic and fluid control arrangement 90, one embodiment of which is diagrammatically illustrated in FIG. 8.

More specifically, control arrangement 90 includes actuator means and in particular a fluidic and more specifically a pneumatic circuitry whereby pressurized fluid and preferably air is connected to a pressure source 93, such as the conventional supply of pressurized air which is provided in many factories. The pressurized air is supplied from source 93 to a main supply conduit 95 through a main on-off control valve 94, and this main supply conduit 95 connects to a branch supply conduit 96 which is used for controlling and supplying pressurized air to the bump cylinder 72 associated with the shifter mechanism. The supply conduit 96 is connected to a pair of branch conduits 98 and 99 through a main flow control valve 97, such as a conventional four-way valve, the latter also having a port which connects to a discharge passage 101 which in turn connects to a suitable reservoir or return tank 102. The branch passage or conduit 98 connects to the lower chamber 91 associated with the bump cylinder 72, and the branch passage or conduit 99 connects to the upper chamber 92 of the bump cylinder 72. The passage 96 also contains therein a pressure regulating valve 104 (such as an electric analog controlled pressure regulating valve) which controls the pressure of the fluid supplied to bump cylinder 71.

The filter press also includes a main controller 111, the latter preferably comprising a microprocessor, which controller controls all of the functions of the press, including controlling the pressurized fluid which is supplied to the bump cylinder 72 for controlling both the weight-sensing and bumping operations thereof. For this purpose, the controller 111 provides and receives various control signals so as to control the overall press operation including the weight-sensing and bumping operations.

The bump cylinder 72 also has position sensors such as magnetically-actuated reed switches S1 and S2 associated therewith for sensing the respective extended and contracted positions of the bump cylinder, whereby a control signal $\underline{a}$ or $\underline{b}$ is sent to the controller 111 only when the cylinder 72 is in the respective extended or contracted position.

The controller 111 also has an internal timer T associated therewith which is provided so as to provide for a predetermined time interval T1 following activation of a weight-sensing cycle, as explained in greater detail hereinafter. The controller also has a keypad (not shown) associated therewith and being manually actuatable for permitting various functions to be manually selected and controlled. For example, the keypad enables program selection for permitting operation of the press without either a bumping or a weight-sensing mode, or for selecting solely the vibrating or bumping mode, or for selecting both the weight-sensing and bumping modes. Further, the keypad also enables the number of sequential bump cycles to be selected during return movement of the filter plate, as well as selecting the number of weight-sensing cycles followed by the selected number of bumping cycles after each weight-sensing cycle. The output pressure from the valve 104 can also be adjusted.

The operation of the press and more specifically the operation of the return movement of the individual filter plates, and specifically the bumping of these plates, or the weight-sensing and subsequent bumping of the plates, will now be briefly described.

When the shifter mechanisms are moved forwardly (leftwardly) to engage the endmost filter plate in the stack adjacent the fixed head 15, the stop lever 42 abuts against the handle of the endmost plate of the stack, and the driving lever 52 projects partially upwardly into the gap between the handles of the endmost and next-adjacent filter plates. The stoppage of the shifter housings by the stop levers 42 causes the drive motor 27 to reverse direction and initiate movement of the shifter mechanisms in a rearward (rightward) direction, and during the initial rearward (rightward) movement the driving lever 52 wedgedly reacts between the handles of the endmost and next-adjacent filter plates so as to effectively pry the endmost filter plate a small distance away from the adjacent plate, thereby effectively breaking any adhesion or suction between the two plates. If at this time the machine controller 111 has been selected to merely sequentially open the plates without activating either (1) a bump cycle or (2) a weight-sensing and bumping cycle, such as due to the filter cake being of a nonsticky type, then the plates will be individually and sequentially moved into an open position adjacent the head 14, and the filtrate will be permitted to fall by gravity downwardly into a collecting bin as the plates are individually opened and moved.

If it has been observed, however, that the cake possesses sticky properties so that some bumping is desired, and if the controller 111 has been manually programmed to provide solely a bumping cycle with the number N (such as 1, 2, 3, . . . ) of sequential bumping cycles during the opening movement of the filter plate also being selectively and adjustably programmed into the controller, then each filter plate during the opening movement thereof will be sequentially and individually bumped the predetermined number of cycles N which has been selected. The number of bumping cycles will occur sequentially as the plate is being moved toward its open position adjacent the open head 14.

More specifically, after the return movement of the shifter has been initiated so that the driving levers 52 have pried the endmost plate away from the next adjacent plate, or more specifically a predetermined time interval after the shifter mechanism initiates its return movement, the controller 111 supplies a control signal $\underline{r}$ to the valve 97 causing it to shift into a position whereby the pressure from the passage 96 is supplied to passage 98 and thence into the bottom chamber 91 of the bumping cylinder 72. At the same time, the valve 97 connects the other passage 99, and hence the upper chamber 92, to the discharge or exhaust passage 101. This causes the bump cylinder 72 to be rapidly extended upwardly, whereupon the piston rod 75 is extended upwardly causing the lifting plate 85 to be swung inwardly into a position beneath the adjacent handle 18 of the filter plate being shifted, with the continued extension of the piston rod 75 causing the lifting member 85 to engage the handle 18 to effect vertical upward lifting of at least one side of the filter plate through a limited vertical extent above the side rail 13. When the bumping cylinder 72 reaches its uppermost or substantially fully extended position, the uppermost position sensing switch S2 sense the presence of the piston rod and transmit a signal $\underline{a}$ back to the controller 111, whereupon the controller transmits a further signal to the valve 97 causing it to reversely shift, thereby connecting passage 98 to the exhaust 101 and simultaneously connecting the passage 99 to the supply pressure passage 96. The supply pressure is thus supplied to the upper chambers 92, causing the bump cylinder 72 to be rapidly driven downwardly into its lowermost position, which is sensed by the position sensor S2 which then transmits a signal b to the controller 111 to indicate that the bump cylinder 72 has returned to its initial or lowermost position. During this rapid downwardly retraction of the piston rod 75, the previously raised filter plate 17 effectively free falls downwardly until the handle 18 abuts the side rail 13, thereby providing a significant bumping or impacting of the filter plate which tends to assist in dislodging the sticky filter cake adhered thereto.

If the controller 111 has been programmed to provide a number N of sequential bumping cycles where N is greater than 1, than the above bumping cycle will be sequentially repeated until the preprogrammed number of bumping cycles N has been completed. All of these bumping cycles will occur as the filter plate is being drivingly moved rearwardly (rightwardly) toward the open head 14.

The operation will now be described where the controller 111 has been preprogrammed to provide for both weight-sensing and bumping (if necessary) of the individual filter plates during the return or opening movement thereof. In this latter operation, the number $N_w$ of sequential weight-sensing cycles, as well as the number $N_b$ of sequential bump cycles following each weight-sensing cycle, will be adjustably preprogrammed in the controller 111.

As the shifter mechanisms initiate return or opening movement and after the endmost filter plate has been moved rearwardly at least a small amount, at least due to the prying apart of the adjacent plates by the driving levers 52 as described above, the initial weight-sensing cycle will be activated. For the purpose, the controller 111 supplies a signal s to the pressure regulator 104, and substantially simultaneously supplies a signal r to the control valve 97 to connect both passages 98 and 99 to the supply pressure passage 96. The regulated pressure in line 96 is thus simultaneously supplied through passages 98 and 99 to the pressure cylinder chambers 91 and 92. Since the cross-sectional area of chamber 92 is greater than the cross-sectional area 91 (due to the presence of rod 75), a force differential effectively acts on the piston 74 and tends to drive the piston 74 and piston rod 75 upwardly. This causes the piston 75 and the lifting plate 85 to be swung inwardly under the handle 18 of the endmost filter plate 17 until the lifting plate 85 engages the handle. If the filter plate 17 is relatively free of cake so that the weight of the plate approximately equals the weight of an empty or clean plate, or only slightly exceeds the weight of an empty plate (for example, is no more than about 110% the weight of an empty plate), then the force differential will be of sufficient magnitude to move the piston rod 75 upwardly to effect lifting of the filter plate 17 and activation of position switch S1 prior to timing out of a predetermined time interval T1, the latter having been preprogrammed in the timer T of the controller 11, with this time interval T1 being initiated at the same time the controller activates the weight-sensing cycle. This thus indicates that the plate is clean and does not require bumping. Thus, when the position sensor S1 transmits the signal a back to the controller 111, the controller switches valve 97 so that pressure is supplied only to the upper chamber 92, thereby drivingly retracting the bump cylinder 72 and thus providing a single bump cycle for the filter plate. Thereafter the filter plate is moved rearwardly by the shifter mechanisms until reaching its home or open position.

On the other hand, if the filter plate has a significant amount of sticky filter cake adhered thereto, then the force differential provided to effect upward extension of the bumping cylinder will be unable to fully extend the cylinder and effect lifting of the dirty filter plate prior to the timer T timing out the preselected time interval T1. When this time interval T1 times out, then controller 111 immediately transmits a signal which switches valve 97 so that passage 98 remains connected to passage 96, but passage 99 is connected to exhaust passage 101. This results in a full lifting force being applied to the bump cylinder 72. This causes the bump cylinder to rapidly fully extend and lift the plate (with the sticky cake adhered thereto) until the position sensor S1 again emits a signal a which effects reversal in the pressurization of the cylinder 72 so that it is drivingly retracted, and the filter plate effectively free falls downwardly so as to bump or impact against the side rail 13. If the number $N_b$ of bumping cycles selected for each weight-sensing cycle is two or more, for example $N_b$=3, then two additional subsequent bump cycles will automatically and sequentially be carried out to further assist in dislodgement of sticky cake.

If the number $N_w$ of weight-sensing cycles has been preprogrammed to be two or more, for example $N_w$3, then after all of the bumping cycles $N_b$ associated with the first weight-sensing cycle has been completed, the second weight-sensing cycle will then be initiated. The second weight-sensing cycle will follow the same pattern as the first cycle described above, and will also include the selected number of bump cycles $N_b$. Of course, if during actuation of the second weight-sensing cycle the bump cylinder 72 is able to lift the plate and fully extend so as to activate upper position sensor S1 prior to timing out of the time T1, then this indicates that the plate is now clean, and the bump cylinders will be returned to their initial positions and no further weight-sensing or bump cycles will be carried out.

With the arrangement of this invention, the number of sequential weight-sensing cycles, and the number of sequential bumping cycles associated with each weight-sensing cycle, can be preprogrammed to provide for optimum performance based upon the properties of the filter cake and the stickiness thereof to the filter plates. At the same time, since dislodgement of the cake from the filter plates will vary from plate to plate, this invention enables the weight-sensing and bumping cycles to be terminated prior to the preprogrammed number if a clean plate is sensed.

Since in many cases the weight of the cake which adheres to the filter plate is approximately equal to the weight of the filter plate, this permits significant discrimination to take place between an empty or clean plate, and a plate having an undesired quantity of cake adhered thereto. This thus enables the pressure regulator 104 to be suitably adjusted so that the force differential as applied to the extension of the lifting cylinder during the weight-sensing cycle can be adjusted so as to provide a fairly high degree of accuracy with respect to sensing a filter plate having the desired degree of cleanliness (i.e., the lack of any significant quantity of filter cake adhered thereto).

It will be appreciated that the weight-sensing and vibrating arrangement of this invention can be provided on either or both shifter mechanisms 22, and can be individually or simultaneously activated.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a filter press having a frame including a pair of generally horizontally elongated and parallel side rails which are disposed in sidewardly spaced relation, first and second head assemblies mounted on said frame adjacent opposite ends of said side rails, said first head assembly being disposed adjacent one end of said side rails and supported for movement horizontally in a lengthwise direction of the side rails forwardly toward and rearwardly away from said second head assembly so as to be respectively positioned in closed and opened positions, said second head assembly being stationarily positioned adjacent the other end of said side rails, a plurality of individual filter plates supported on and between said side rails for movement therealong between said first and second head assemblies, said plurality of filter plates being pushed together into a horizontally extending closed stack and clampingly held between said first and second head assemblies when said first head assembly is moved toward said second head assembly into said closed position, and a plate shifting arrangement for effecting individual and sequential shifting of said filter plates from said closed stack along said side rails in said rearward direction toward said first head assembly when in the opened position, said plate shifting arrangement including a shifter mechanism movably supported adjacent one of said side rails and being linearly movable in a back and forth manner in the lengthwise direction thereof to cause sequential shifting of the individual filter plates from the closed stack along the side rails to a position adjacent the opened first head assembly, comprising the improvement wherein the shifter mechanism mounts thereon a vibrating device which includes actuator means for activating said vibrating device in response to movement of the shifter assembly in said rearward direction and which cooperates with the shifted filter plate for effecting vertical bumping of the shifted filter plate after the plate has been moved away from the closed stack, and control means for sensing the weight of the shifted filter plate and thereafter activating said actuator means of said vibrating device to effect said bumping only if the sensed weight exceeds a predetermined amount, said vibrating device including a lift member which is vertically movable between lowered and raised positions, said lift member being normally disposed in said lowered position at an elevation below a lower surface of said filter plate, said vibrating device further including lift means for moving said lift member vertically between said raised and lowered positions in response to said actuator means so as to respectively apply first and second lifting forces to said filter plate during bumping and weight sensing, said first lifting force being substantially greater than said second lifting force.

2. A filter press according to claim 1, wherein said vibrating device includes cam means associated therewith for causing the lift member to be horizontally moved inwardly toward the respectively adjacent side rail as the lift member is displaced vertically upwardly to position the lift member directly under the lower surface which is defined by a handle of the shifted filter plate.

3. A filter press according to claim 1, wherein said lift means is a pressure cylinder, said control means controlling said actuator means to apply a first fluid lifting pressure to said pressure cylinder to effect lifting of said lift member to sense the weight of the shifted filter plate, and to apply a second fluid lifting pressure to said cylinder to effect lifting of said shifted filter plate during bumping thereof, said second pressure being substantially greater than said first pressure and said first and second lifting forces being defined respectively by said first and second pressures.

4. A filter press according to claim 3, wherein said pressure cylinder is a double acting cylinder and defines first and second interior pressure chambers which respectively control vertical raising and lowering of said lift member, said actuator means supplying pressure fluid to said pressure cylinder in response to said control means to respectively define said first and second lifting forces during bumping and weight sensing, said first lifting force being substantially greater than said second lifting force.

5. A filter press according to claim 4, wherein said vibrating device includes cam means associated therewith for causing the lift member to be horizontally moved inwardly toward the respectively adjacent side rail as the lift member is displaced vertically upwardly to position the lift member directly under a handle of the shifted filter plate which defines said lower surface.

6. A filter press according to claim 5, wherein said pressure cylinder has a hollow cylinder housing mounted on said shifter housing for vertical pivoting movement about a substantially horizontal axis which is substantially parallel to the longitudinal direction of the press, said pressure cylinder having a piston rod projecting upwardly from said cylinder housing for substantially vertical extension from and contraction into said cylinder housing, said lift member being fixed to said piston rod adjacent an upper free end thereof, and said cam means coacting with a follower carried by said piston rod for causing vertical pivoting of said pressure cylinder about said horizontal axis in response to vertical extension or contraction of the piston rod.

7. A filter press according to claim 3, wherein said pressure cylinder includes first and second pressure chambers separated by a slidable piston which is connected to a piston rod that projects outwardly through said first pressure chamber and interconnects to said lifting member, said first pressure chamber having a smaller cross-sectional area than said second pressure chamber, said control means causing fluid pressure to be supplied to both said first and second pressure chambers by said actuator means to generate said second lifting force for said weighing, said control means relieving pressure from said first pressure chamber and supplying said pressure fluid solely to said second pressure chamber to generate said first lifting force for said bumping.

8. A filter press according to claim 7, wherein the control means includes timing means defining a predetermined time interval which is activated when the pressure cylinder is initially pressurized, said control means causing said first pressure chamber to be relieved of pressure only if said predetermined time interval expires prior to said lifting member reaching its raised position.

9. A filter press according to claim 1, wherein said control means includes timer means which defines a predetermined time interval and is activated when said second lifting force is applied, said control, means applying said first lifting force to said filter plate if said time interval expires before said second lifting force has moved said lift member to said raised position.

10. A filter press according to claim 1, wherein said lift means comprises a double-acting pressure cylinder having first and second interior pressure chambers separated by a slidable piston which is connected to a piston rod that projects outwardly through said first pressure chamber and interconnects to said lifting member, said second pressure chamber having a greater cross-sectional area than said first pressure chamber, said control means supplying a pressurized fluid to said first and second pressure chambers such that a force differential acts on said piston to define said second lifting force.

11. A filter press according to claim 10, wherein said fluid pressure in said first pressure chamber is reduced by said control means to define said first lifting force.

12. In a filter press having a frame including a pair of generally horizontally elongated and parallel side rails which are disposed in sidewardly spaced relation, first and second head assemblies mounted on said frame adjacent opposite ends of said side rails, said first head assembly being disposed adjacent one end of said side rails and supported for movement horizontally in a lengthwise direction of the side rails forwardly toward and rearwardly away from said second head assembly so as to be respectively positioned in closed and opened positions, said second head assembly being stationarily positioned adjacent the other end of said side rails, a plurality of individual filter plates supported on and between said side rails for movement therealong between said first and second head assemblies, said plurality of filter plates being pushed together into a horizontally extending closed stack and clampingly held between said first and second head assemblies when said first head assembly is moved toward said second head assembly into said closed position, and a plate shifting arrangement for effecting individual and sequential shifting of said filter plates from said closed stack along said side rails in said rearward direction toward said first head assembly when in the opened position, said plate shifting arrangement including a shifter mechanism having a shifter housing movably supported adjacent one of said side rails and being linearly movable in a back and forth manner in the lengthwise direction thereof to cause sequential shifting of the individual filter plates from the closed stack along the side rails to a position adjacent the opened first head assembly, comprising the improvement wherein the shifter mechanism mounts thereon a vibrating device which including actuator means for activating said vibrating device in response to movement of the shifter assembly in said rearward direction and which cooperates with the shifted filter plate for effecting vertical bumping of the shifted filter plate after the plate has been moved away from the closed stack, said vibrating device including a lift member which is vertically movable between lowered and raised positions, said lift member being normally disposed in said lowered position at an elevation below a sidewardly-protruding handle of said filter plate, said vibrating device further including lift means for moving said lift member vertically between said raised and lowered positions in response to said actuator means, said filter press further including control means for sensing the weight of the shifted filter plate and thereafter activating said actuator means of said vibrating device to effect said bumping only if the sensed weight exceeds a predetermined amount, the shifter mechanism including a stop member movably supported on said shifter housing and normally maintained in a position for engaging a front face of the endmost filter plate in the closed stack for stopping linear movement of said shifter mechanism in said forward direction, and a plate driving member movably supported on said shifter housing in spaced relationship from said stop member and being movable into a raised position for engaging a rear surface of the endmost plate of the closed stack so as to engage and drivingly push said endmost plate along the side rails toward the opened first head assembly when the shifter mechanism is moved in said rearward direction, and wherein said lift member is positioned generally between said stop member and said driving member relative to the longitudinal direction of the press when the lift member is raised upwardly for engagement with the handle of the shifted filter plate.

13. A filter press according to claim 12, wherein said vibrating device includes cam means associated therewith for causing the lift member to be horizontally moved inwardly toward the repectively adjacent side rail as the lift member is displaced vertically upwardly to position the lift member directly under the handle of the shifted filter plate.

14. In a filter press having a frame including a pair of generally horizontally elongated and parallel side rails which are disposed in sidewardly spaced relation, first and second head assemblies mounted on said frame adjacent opposite ends of said side rails, said first head assembly being disposed adjacent one end of said side rails and supported for movement horizontally in a lengthwise direction of the side rails forwardly toward and rearwardly away from said second head assembly so as to be respectively positioned in closed and opened positions, said second head assembly being stationarily positioned adjacent the other end of said side rails, a plurality of individual filter plates supported on and between said side rails for movement therealong between said first and second head assemblies, said plurality of filter plates being pushed together into a horizontally extending closed stack and clampingly held between said first and second head assemblies when said first head assembly is moved toward said second head assembly into said closed position, and a plate shifting arrangement for effecting individual and sequential shifting of said filter plates from said closed stack along said side rails in said rearward direction toward said first head assembly when in the opened position, said plate shifting arrangement including a shifter mechanism movably supported adjacent one of said side rails and being linearly movable in a back and forth manner in the lengthwise direction thereof to cause sequential shifting of the individual filter plates from the closed stack along the side rails to a position adjacent the opened first head assembly, comprising the improvement wherein the shifter mechanism mounts thereon a vibrating device which includes actuator means for activating said vibrating device in response to movement of the shifter assembly in said rearward direction and which cooperates with the shifted filter plate for effecting vertical bumping of the shifted filter plate after the plate has been moved away from the closed stack, the shifter mechanism includes a shifter housing which is movably supported adjacent said side rail and is linearly movably in a back and forth manner in the lengthwise direction thereof, said vibrating device includes a fluid pressure cylinder mounted on said shifter housing and having a lift member which is mounted on and is vertically movable by said pressure cylinder between lowered and raised positions, said lift member being normally disposed in said lowered position at an elevation below a sidewardly-protruding handle of the filter plate, and said vibrating device includes cam means associated therewith for causing the lift member to be horizontally moved inwardly toward the respectively adjacent side rail as the lift member is displaced vertically upwardly to position the lift member directly under the handle of the shifted filter plate.

15. A filter press according to claim 14, wherein said pressure cylinder has a hollow cylinder housing mounted on said shifter housing for vertical pivoting movement about a substantially horizontal axis which is substantially parallel to the longitudinal direction of the press, said pressure cylinder having a piston rod projecting upwardly from said cylinder housing for substantially vertical extension from and contraction into said cylinder housing, said lift member being fixed to said piston rod adjacent an upper free end thereof, and said cam means coacting with a follower carried by said piston rod for causing vertical pivoting of said pressure cylinder about said horizontal axis in response to vertical extension or contraction of the piston rod.

16. A filter press according to claim 14, which includes control means for sensing the weight of the shifted filter plate and thereafter activating said actuator means of said vibrating device only if the sensed weight exceeds a predetermined amount.

17. In a filter press having a frame including a pair of generally horizontally elongated and parallel side rails which are disposed in sidewardly spaced relation, first and second head assemblies mounted on said frame adjacent opposite ends of said side rails, said first head assembly being disposed adjacent one end of said side rails and supported for movement horizontally in a lengthwise direction of the side rails forwardly toward and rearwardly away from said second head assembly so as to be respectively positioned in closed and opened positions, said second head assembly being stationarily positioned adjacent the other end of said side rails, a plurality of individual filter plates supported on and between said side rails for movement therealong between said first and second head assemblies, said plurality of filter plates being pushed together into a horizontally extending closed stack and clampingly held between said first and second head assemblies when said first head assembly is moved toward said second head assembly into said closed position, and a plate shifting arrangement for effecting individual and sequential shifting of said filter plates from said closed stack along said side rails in said rearward direction toward said first head assembly when in the opened position, said plate shifting arrangement including a shifter mechanism movably supported adjacent one of said side rails and being linearly movable in a back and forth manner in the lengthwise direction thereof to cause sequential shifting of the individual filter plates from the closed stack along the side rails to a position adjacent the opened first head assembly, comprising the improvement wherein the shifter mechanism mounts thereon a vibrating device which includes actuator means for activating said vibrating device in response to movement of the shifter assembly in said rearward direction and which cooperates with the shifted filter plate for effecting vertical bumping of the shifted filter plate after the plate has been moved away from the closed stack, the shifter mechanism includes a shifter housing which is movably supported adjacent said side rail and is linearly movably in a back and forth manner in the lengthwise direction thereof, said vibrating device includes a fluid pressure cylinder mounted on said shifter housing and having a lift member which is mounted on and is vertically movable by said pressure cylinder between lowered and raised positions, said lift member being normally disposed in said lowered position at an elevation below a sidewardly-protruding handle of the filter plate, said vibrating device includes cam means associated therewith for causing the lift member to be horizontally moved inwardly toward the respectively adjacent side rail as the lift member is displaced vertically upwardly to position the lift member directly under the handle of the shifted filter plate, and the shifter mechanism includes a stop member movably supported on said shifter housing and normally maintained in a position for engaging a front face of the endmost filter plate in the closed stack for stopping linear movement of said shifter mechanism in said forward direction, and a plate driving member movably supported on said shifter housing in spaced relationship from said stop member and being movable into a raised position for engaging a rear surface of the endmost plate of the closed stack so as to engage and drivingly push said endmost plate along the side rails toward the open first head assembly when the shifter mechanism is moved in said rearward direction, and said lift member is positioned generally between said stop member and said driving member relative to the longitudinal direction of the press when the lift member is raised upwardly for engagement with the handle of the shifted filter plate.

18. A filter press according to claim 17, wherein said pressure cylinder has a hollow cylinder housing mounted on said shifter housing for vertical pivoting movement about a substantially horizontal axis which is substantially parallel to the longitudinal direction of the press, said pressure cylinder having a piston rod projecting upwardly from said cylinder housing for substantially vertical extension from and contraction into said cylinder housing, said lift member being fixed to said piston rod adjacent an upper free end thereof, and said cam means coacting with a follower carried by said piston rod for causing vertical pivoting of said pressure cylinder about said horizontal axis in response to vertical extension or contraction of the piston rod.

* * * * *

UNITED STATES PATENT AND TRADEMARK OFFICE
CERTIFICATE OF CORRECTION

PATENT NO. : 5 674 384
DATED : October 7, 1997
INVENTOR(S) : David Mark Higgins

It is certified that error appears in the above-indentified patent and that said Letters Patent is hereby corrected as shown below:

Column 15, line 36; change "including" to ---includes---.

Signed and Sealed this

Thirty-first Day of March, 1998

Attest:

BRUCE LEHMAN

*Attesting Officer*         *Commissioner of Patents and Trademarks*